United States Patent [19]

Goettl

[11] Patent Number: 4,592,379

[45] Date of Patent: Jun. 3, 1986

[54] FLUID DISTRIBUTION VALVE

[75] Inventor: John M. Goettl, Phoenix, Ariz.

[73] Assignee: George J. Ghiz, Phoenix, Ariz.

[21] Appl. No.: 604,862

[22] Filed: Apr. 27, 1984

[51] Int. Cl.$^4$ .............................................. F16K 11/14
[52] U.S. Cl. ................................ 137/119; 137/624.14; 137/627
[58] Field of Search .............. 137/119, 624.14, 625.11, 137/627, 624.18

[56] References Cited

U.S. PATENT DOCUMENTS

2,644,484  7/1953  Mansen.
4,313,455  2/1982  Pitman ............................ 137/627 X

Primary Examiner—Alan Cohan
Attorney, Agent, or Firm—Charles E. Cates; Victor Myer

[57] ABSTRACT

A fluid distributing valve has the supply opening or conduit and the outlet openings or conduits disposed on the same side of the valve and oriented in the same direction. Accordingly the need for having couplings or unions to connect the supply pipe to the valve are eliminated. The valve includes a flow chamber or compartment and a control chamber or compartment so that the fluid passing through the valve does not flow past the operating members. By-passes are provided which may be finely screened to provide control water from the flow chamber to the control chamber. The valves are diaphragm operated, close, and remain closed against the flow pressure and are thus normally closed. They are open by a rotating operating cam whose operating surface moves cylindrical balls out of the way so that pressure in the control compartment can be exerted against the upper operating surface of the diaphragm operating members. A pause control mechanism is included so that the valve movement can be stopped or paused at any position desired and since in so doing the valve member at that position is open, flow continues in the flow chamber. When the pause mechanism is released the impeller begins and continues to rotate causing the distributing valve to pick up and move on from where it was stopped.

12 Claims, 8 Drawing Figures fig.1 fig.2 fig.3 fig.6

FLUID DISTRIBUTION VALVE

BACKGROUND OF THE INVENTION

This invention relates to fluid distributing valves, more particularly to such valves wherein a fluid such as water is received from a single source and is distributed through individual conduits to a plurality of utility devices. It is an object of the invention to provide an improved distribution valve and/or a system of this nature.

The invention has particular application to a system for operating a series of pop-up cleaning heads in a swimming pool environment. It will be evident however that the apparatus and system have application to other fluid distribution systems such as sprinkler systems, tank cleaning systems and the like. The examples given are by way of illustration only and are not intended to be restrictive in any way.

Valves of the nature involved in this application are known to the prior art. For example, references may be made to the U.S. Pat. Nos. 1,753,240 Howell et al, 3,405,733 Hansen, 3,472,265 Davis, 3,779,269 Gould, 4,022,239 Schwindt et al, 4,077,424 Ehret et al and 4,313,455 Donald G. Pitman.

In each of the listed patents, except Schwindt et al, the supply water and the water outlets operate from different senses and directions, thus requiring additional plumbing connections to the source to make the device serviceable. Of these patents Hansen, Gould and Ehret et al disclose valves that may be known as a flat plate valves wherein a relatively flat valve plate having a hole therein is rotated over the outlet openings so that water flows through the particular outlet where the opening appears. These valves are not plunger operated. In the Schwindt et al patent the inlet water and the outlet water flow in conduits whose sense is the same but the direction of water flow is different, this being similar to that aspect of the subject invention. In the Howell et al patent plungers are utilized to close the valve openings but mechanical levers are used for this purpose. In the Davis patent spherical balls are used to open and close the outlets. The balls are moved into and out of position by cam surfaces. In none of the prior art devices is there a separation of flow water and control water.

In the Pitman U.S. Pat. No. 4,313,455 a distributing valve for a swimming pool is provided which has a sealed self-contained body which includes all of the working parts. This self-contained body is then attached to a base plate to which the outlet pipes are attached. The inlet pipe or conduit is attached to the top of the self-contained body and thus all of the liquid that passes to the swimming pool goes through the working parts of the valves. All of the water passing through the valve needs to be strained requiring that the strainer cannot be of optimum fineness because it would involve flow restriction. Further, since the self-contained portion of the valve must be returned on occasion to the shop for servicing a pipe union must be provided at the inlet of the device so that removal is possible.

Interiorly of the Pitman device a ring gear which provides part of the mechanism for rotating the sequencing valve structure is permanently molded as part of the removable top part. This makes engagement with the ring gear by other interior operating gears rather difficult and if something happens to damage the ring gear the whole cover part or top must be replaced.

Also interiorly of the Pitman cover are a series of individual valve members, usually of an uneven number, for example, five. The valve members are spaced from a base plate through which space the water flows from the inlet to the various outlets. That is to say, all of the working parts are in the chamber defined by a base and a cover and this chamber is filled with liquid at the supply pressure. Thus during any required pressure testing the individual valve members must be removed in order to allow flow of pressure test fluid to communicate with all circuits connected to the valve.

Further in Pitman type devices, if a normally closed valve fails, it will fail closed thereby terminating all flow through the valve with the resultant increase in static pressure resulting in possible pump and system damage. Servicing usually requires replacement of the entire valve and pressure testing is conducted by a special housing with no internal devices present followed by replacement with a working valve for normal operations. The individual valves of Pitman are moved to the closed position by the application of the supply pressure to one side of a diaphragm. In this instance, the closing rate of the valve is very difficult to control because the valve is closing with the direction of fluid flow. As the valve plunger approaches the valve seat it is no longer controlled by the pilot pressure and is rapidly forced to a closed position causing water hammer. The failure of filters and other system components is common with such prior art devices. Many attempts have been made to control this by changing valve cam angles and/or disrupting the valve seat to reduce the differential between the internal high pressure of the valve body and the low pressure area of any given valve port that is closed or closing. This further results in additional operating pressure reduction.

In the operation of prior art cleaning systems such as one utilizing the U.S. Pat. No. 4,313,455 certain problems during operation are presented. For example, cleaning heads on steps or benches in the shallow end of the swimming pool may be objectionable to swimmers. Similarly the operation of heads in the floor of the pool may be objectionable when brushing because debris may be inadvertently acted upon and dispersed before manual removal is complete. The pressure in the system or, for example, at the pump is greater when the cleaning system is in operation thus reducing the system flow (filtration rate). To achieve maximum flow when cleaning is not in operation or to stop operation of the cleaning system for any of the above reasons additional valving may be required. For example, a by-pass valve from the output of the filter to the swimming pool, and a valve in the line to the distributing valve so that the distributing valve can be rendered totally inoperative.

SUMMARY OF THE INVENTION

According to the invention a three-piece rotating distributing valve is provided having, in essence, a permanent base member, a unitized valve module for easy replacement or removal for testing and which contains all of the operating parts, and a removable top which has no plumbing connections to it. The only operating part in the wall of the removable top is a specific control knob for stopping the valve in any position desired. The permanent body base or base contains no working parts or valve seats and provides a space within which the unitized valve module is received. The permanent base member contains the inlet as well as the outlets which as a practical matter may be disposed in the same direction. As even number of outlets may be provided so that one distributing valve may be utilized as a source for two other distributing valves thus making it possible to distribute water to a greater number of utilization points. The individual valve members are disposed in the valve module and the operating members for the valves are separated from the valves themselves which operate against a shut-off plate.

The space between the valve housing and the shut-off plate provides a water flow chamber or area. The supply pressure in this area tends to close the individual valves rather than to open them. The space above the unitized valve module and underneath the removable top and certain areas within the unitized valve module provide a control chamber in which only control water is received. The flow water from inlet to outlet does not enter the control chamber except as a control function. Since only a small amount of water is necessary for control purposes this water can be strained and supplied to the control chambers through relatively small areas thus enabling very fine screens to be used to strain out any grit, or the like. The certainty of operation of the valves is greatly assured. Inasmuch as the unitized valve module is easily removed and the removable top or cover replaced pressure testing may be carried out with relatively little inconvenience.

If the diaphragms operating the valves in the applicant's structure are ruptured, for example, the valves open, thus continuing flow from the inlet through outlet. There is no consequent increase in pressure within the valve control compartment under this condition. Further since the valves close against the direction of the flow, closing rate can be precisely controlled by the design of the cam which controls the application of pressure to one side of the valve diaphragm. Consequently, there is no water hammer.

The design of the inventive system and device is such that the valve sequencing operation can be stopped at any point in its cycle, so that any particular utilization device or cleaning head can be selectively operated while all others are disabled. Thus, during the times when desired the cleaning heads on steps or benches, or anywhere else, may be turned off while a selected circuit will continue to function as an inlet means to the pool. All of this can be carried out without the provision of additional valving or piping.

It is an object of the invention to provide an improved distributing valve of the nature indicated which overcomes the defects of the prior art.

It is a further object of the invention to provide an improved distributing valve of the nature indicated wherein there is a separation of flow water and control water.

It is a further object of the invention to provide an improved distributing valve of the nature indicated which is simple in form, and concept, efficient in operation, and relatively inexpensive to construct.

It is a further object of the invention to provide an improved distributing valve of the nature indicated which is simple and economical to install, easy to service, and simple to test.

Further objects and advantages of the invention will appear as the description proceeds and it is intended to cover all of such variations as are within the scope of the disclosure.

In carrying out the invention according to one form there is provided a fluid distribution valve comprising a flow chamber and a control chamber separated from each other, a fluid passage from the flow chamber to the control chamber, inlet flow means to and a series of outlet flow means from the flow chamber, a series of valve means one each being in each of the series of outlet flow means, and means controlled from the control chamber for sequentially operating the valves of the series of valves.

In carrying out the invention according to another form there is provided a fluid distribution valve comprising a base member having a fluid inlet and a series of fluid outlets therein, a valve plate having an inlet opening and a series of valve seat openings disposed on the base with corresponding openings in alignment, a series of valve members disposed adjacent the valve seat openings for closing and opening same, a piston housing member having a series of chambers corresponding to the valve members disposed on the base and spaced from the valve plate to form a flow chamber, a series of two sided pistons one each of which is disposed in each chamber of the piston housing, each of the pistons being connected to one of the valve members for operating same, a cover member disposed on the base member over the piston housing and with the piston housing defining a control chamber, first openings connecting the flow chamber and the control chamber, second openings between one side of each of the two sided pistons and the flow chamber, third openings between the other side of the two sided pistons and the control chamber, means for controlling the third openings between an open state and a closed state, an impeller in the flow chamber adjacent the inlet opening and adapted to rotate upon flow through the inlet opening, gear mechanism in the control chamber connected to the impeller, and means operated by the gear mechanism in response to rotation of the impeller for sequentially actuating the controlling means.

In carrying out the invention according to still another form there is provided a fluid distribution valve comprising a base member having an inlet port and a series of outlet ports for attachment to plumbing connections, a removable valve module member having an inlet port, a series of outlet ports and valve operating components ponents being disposed in the base member with the inlet ports and the outlet ports in registration with each other, respectively, and a non-plumbing connection cover member attached to the base member.

BRIEF DESCRIPTION OF THE DRAWINGS

For a more complete understanding of the invention, reference may be had to the accompanying drawings in which.

DESCRIPTION OF THE PREFERRED EMBODIMENT

Figure 1:
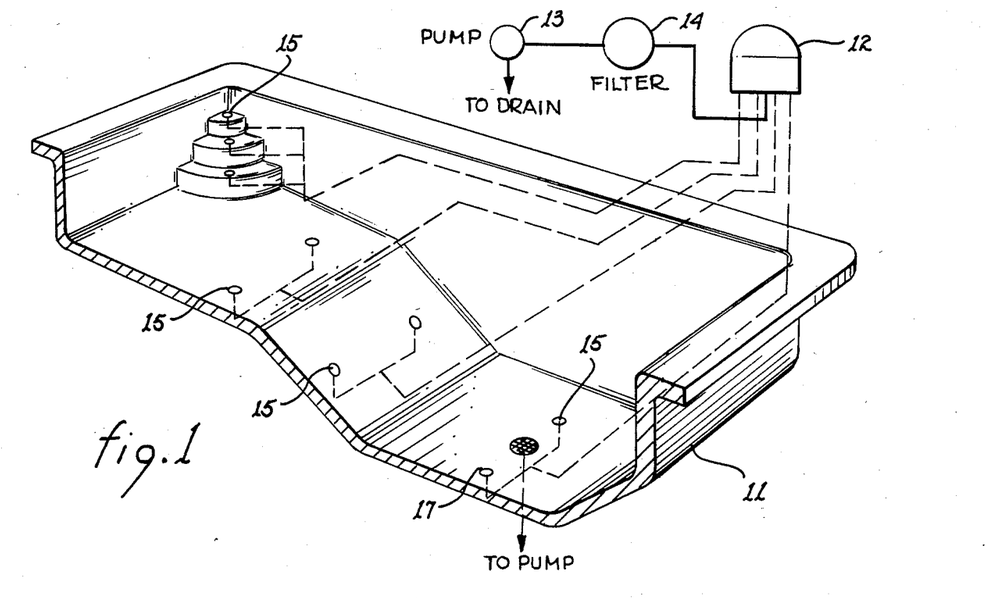
FIG. 1 is a sectional view, in perspective, of a swimming pool illustrating an application of the invention.

Referring to FIG. 1 of the drawings there is shown a system 10 including a swimming pool 11, shown in section, a distributing valve 12 according to the invention, a pump 13 and a filter 14 which, except for the distributing valve 12 and the system of operation, are essentially well-known. The pool is shown equipped with pop-up cleaning heads or nozzles 15 connected by appropriate conduits 16 to the distributing valve 12. The pump 13 is connected to the filter 14 and the filter to the inlet of the valve 12 by appropriate piping and the pool drain 17 is connected to the pump 13 as is well understood. Other features, such as, for example, a skimmer, not shown, would of course be associated with a pool as desired and are not shown here in the interest of simplicity and as not affecting the various aspects of the invention.

Figure 2:
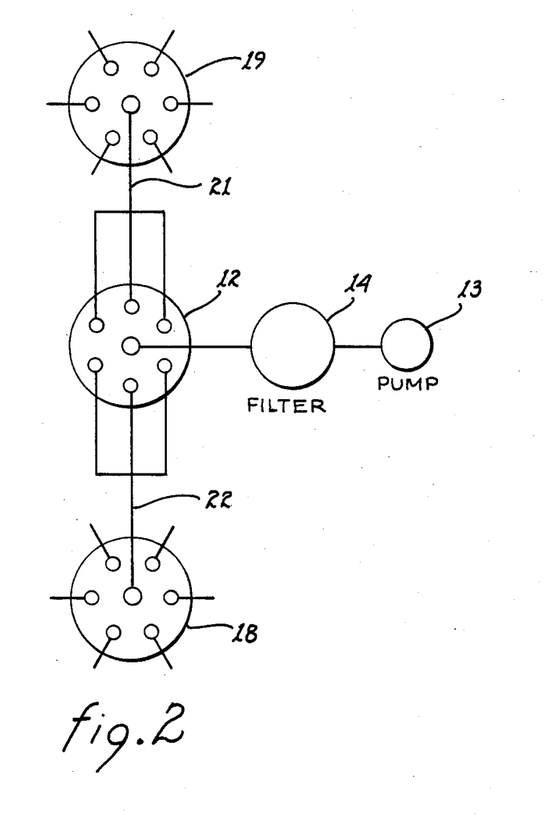
FIG. 2 is a circuit diagram illustrating the systemic use of the inventive device with two other inventive devices.

In FIG. 2 a system is shown wherein a single distributing valve 12 according to the invention may be utilized to supply two additional distributing valves 18 and 19 also according to the invention so that instead of having only six outlets there are a total of twelve. So long as there is an even number of outlets from the valve 12, two additional valves 18 and 19 may be supplied and each receive the same amount of water. For this purpose three of the outlets of valve 12 are connected together and supply the inlet of valve 19 through a conduit 21 and the other three outlets of valve 12 are connected together to the inlet of valve 18 through a conduit 22. This system may be carried further by connecting each two of the outlets of valve 12 together and thus supplying three additional distributing valves. The pump 13 and the filter 14 of course are those as shown in FIG. 1 and need not be of any larger capacity in order to supply the additional valves.

Figure 3:
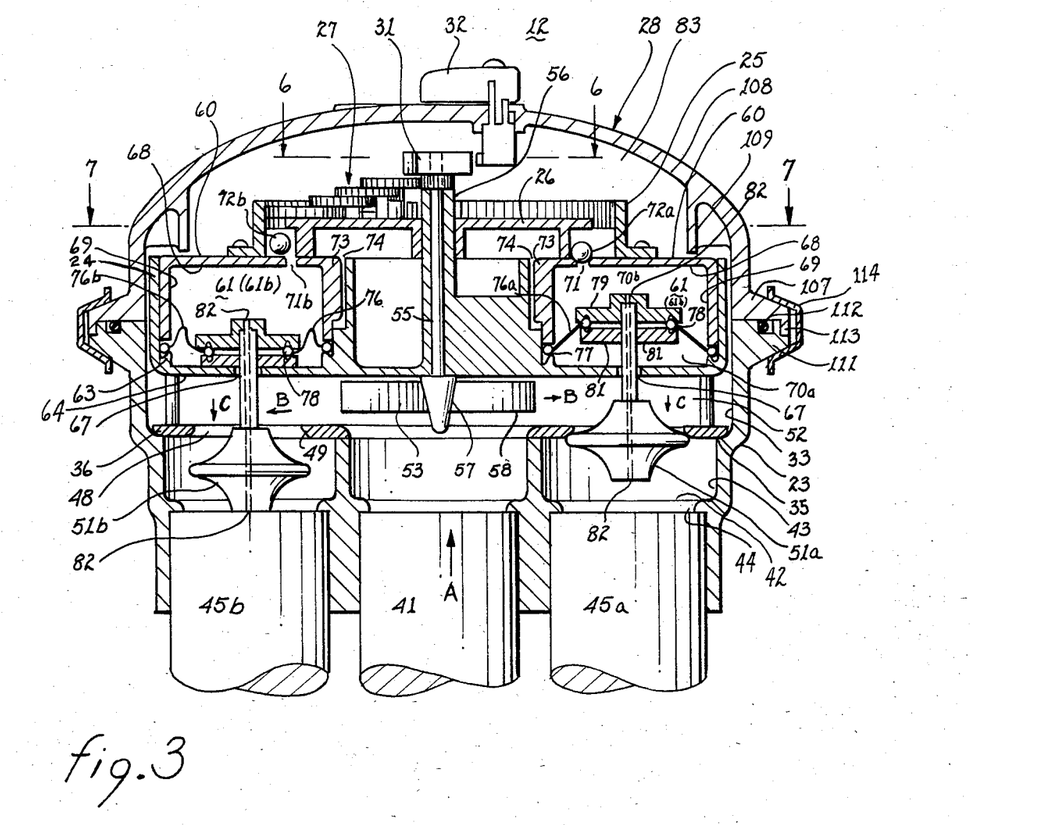
FIG. 3 is a sectional view of the inventive device illustrating the mode of operation.
Figures 4, 8:
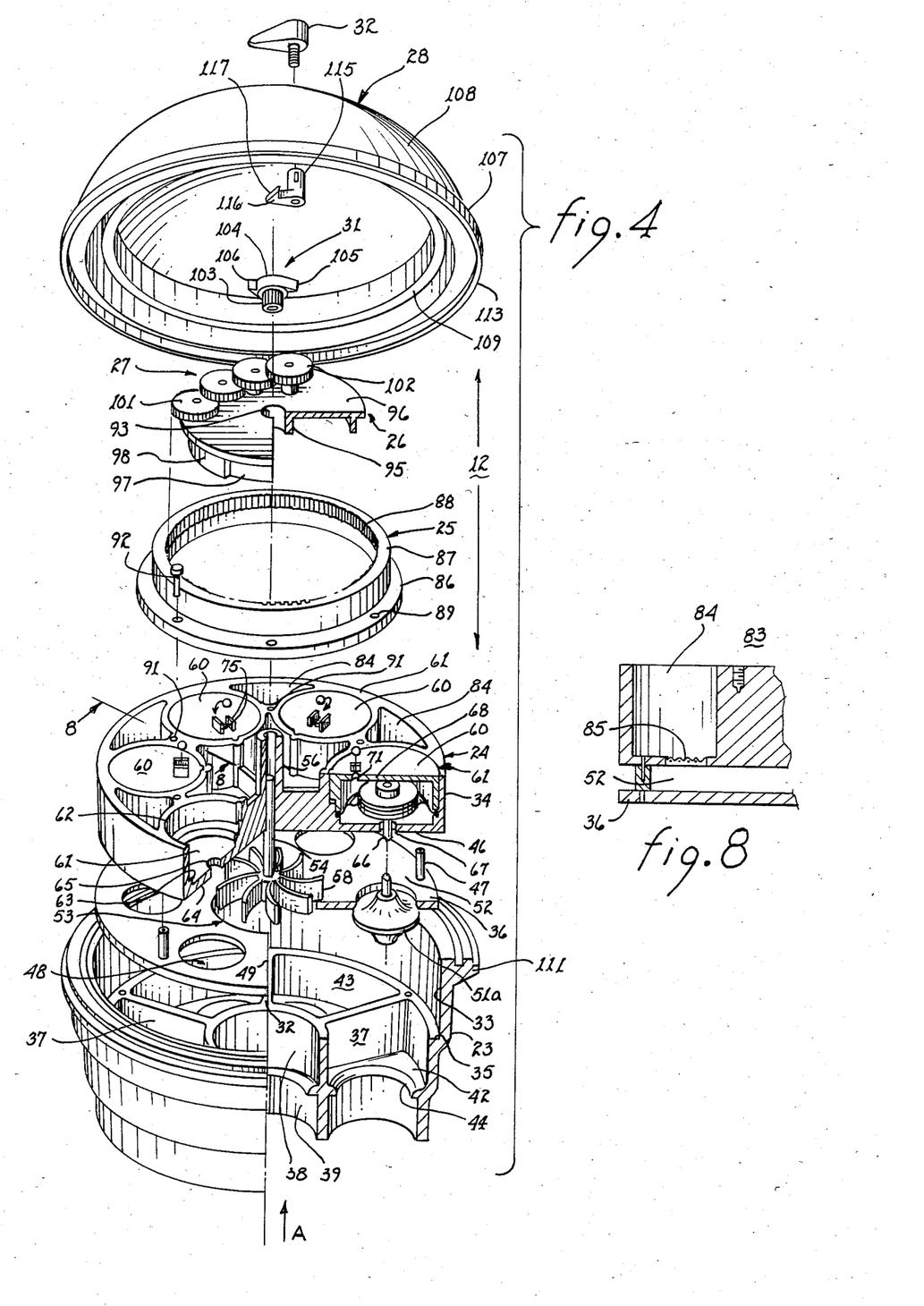
FIG. 4 is an exploded view, in perspective, on a slightly smaller scale, illustrating the various parts of the inventive device.
FIG. 8 is a sectional view taken substantially in the direction of the arrows 8—8 of FIG. 4.

In FIGS. 3 and 4 the distributing valve 12 is shown, respectively, in assembled and exploded condition and also fragmentarily in FIGS. 5, 6, 7 and 8.

Thus the distributing valve may be considered to have a distributor valve base 23, a modular piston housing 24, pistons, operating parts and valve members to be described, a ring gear 25, a valve operator 26, a gear system 27, a distributor valve cover or top 28, a pause mechanism 31, including an operating knob 32, and additional parts as will be understood, to be described.

In the invention as illustrated there are a total of six valves and therefore six valve outlet members to serve six conduits and thus six utility devices such as pop-up cleaning heads. It will be evident that other numbers of valve members may be provided without departing from the spirit of the invention.

The distributor valve base 23 is, essentially, a cylindrical member made of lightweight plastic material and is provided with a honeycomb structure to provide the needed strength and rigidity. Interiorly of the upper portion of the base 23 there is an inner cylindrical surface 33 for receiving the exterior cylindrical surface 34 of the modular piston housing 24. The inner cylindrical surface 33 terminates in a shoulder 35 upon which the valve shut-off plate 36 forming part of the piston housing structure 24 rests, the piston housing 24 being indexed with respect to the base 23 in any well known manner so that each of the valve members assumes the correct position, as will become clear. Extending radially inwardly from the shoulder 35 is a series of ribs 37 terminating in a central ring 38, or opening, which continues to the central ring or opening 39 into which the inlet conduit 41 is received. The ribs 37 together with the central ring 38, that part of the base 23 including the shoulder 35, and the partition member 42 define a series of chambers 43. The partition member 42 includes a series of openings 44 through which water will pass to join the outlet conduits 45. In the construction as shown there will be six openings 44 each of which feeds into one of six conduits 45. The number of conduits being even one valve may be used as a source for two or more other valves to provide equal distribution of water flow as already explained.

Disposed above the base 23 is the modular piston housing 24 which includes the valve shut-off plate 36 spaced from the floor 46 of the piston module by appropriate spacers 47. The diameter of the outer cylindrical surface 34 of the module 24 is such as to just fit easily within the inner cylindrical surface 33. The fit is sufficiently close that there is no significant leakage of fluid from the top surface of the module 24 to the bottom surface or vice versa. Similarly in the assembled condition the valve shut-off plate 36 rests against the shoulder 35 on the outer diameter of the base 23 and upon the upper surface of the cylindrical opening 38 as well as the upper surfaces of the ribs 37 so that no leakage takes place from the upper surface of the valve shut off plate 36 into the chambers 43.

The valve shut off plate 36 has a series of valve openings 48 therethrough, the number being six in the instance described in order to correspond to the number of openings 44 through which the outlet water flows. The valve openings 48 have chamfered valve seats 49 and a plurality of valve members 51 (51a, 51b) are provided, one for each valve seat. When the module 24 is disposed in the base 23, the parts may be indexed so that each valve 51a is disposed to cooperate with the one of the chambers 43 cooperating with the opening 44 which is connected to outlet conduit 45a, as will be understood. The valve shut off plate 36 is disposed away from the lower wall or floor 46 of the module 24 to provide a space or chamber 52 within which is disposed the impeller 53. The space 52 together with the adjacent portion of the wall 33 of the base forms a flow chamber for the valve operation in that water flows in through the inlet opening 39, impinges upon the blades of the impeller 53 and then spreads outwardly to flow through the various valve openings 48 whenever the particular valve is open as will become clear. The impeller 53 is supported by means of a shaft 54 which extends up through a shaft bearing 55 including an extending hub 56.

The impeller 53 has a central hub 57 from which extend radially curved blades 58. The water flowing inwardly as shown by the arrow A in FIGS. 3 and 5 engages the blades 58 in the direction of water flow. Thus there is little or no shear force exerted against the blades 58 by the relatively high pressure water flowing against them. After the water hits the barrier or floor 46 of the module 34 and it is directed radially outwardly the radial component of the water flow then engages the radially extending blades 58 and causes the impeller 53 to rotate.

The piston housing 24 is essentially a hollow member for lightweight construction and includes various ribs etc. for making the structure of the necessary rigidity. Six valves operating chambers 61 are provided in the piston housing. Each chamber includes a cylindrical wall 62 adjacent the bottom of which is a cylindrical lip 63 terminating in the bottom, or floor, 64 forming part of the cylindrical chambers 61. Centrally of each cylindrical chamber 61 and centrally through the bottom is a series of openings 65 through which valve stems extend, the openings 65 being of a slightly larger diameter than the shaft or stems 66 so that an opening is provided through which water can flow into the lower valve chamber 70a from the flow compartment 52 as will be more particularly described.

In each of the cylindrical chambers 61 is a cup retainer 60 which is in effect a cylindrical member having a top surface 68 and a cylindrical wall 69. The top surfaces 68 each include an opening 71 having a conical surface 71a upon which there is adapted to seat a lightweight spherical ball 72 (72a) for valve member operating purposes as will be subsequently described. The cylindrical walls 69 include the protruding lips 73 which is received in a corresponding slot 74 in the cylindrical wall 69 for holding the cup retainers 60 in the appropriate position. On top of each top surface 68 is a pair of parallel projections 75 (FIG. 7) forming lateral retainers for the balls 72.

Disposed within each chamber 61 is a flexible diaphragm 76 (76a, 76b) which is annular in contour, the outer edge 77 of which is clamped between the lower edge of the walls
69 of the cup retainers 60 and the lips 63. The inner edge 78 of the diaphragm is clamped between two retaining members 79 and 81, in effect, forming part of the valve member operating pistons.

The retaining members 79 and 81 and the valve stems 66 which are relatively rigidly attached to them include a passageway 82. Thus there is a chamber 70b above the diaphragm 76 which is in communication with the outflow area exemplified by the outlet conduits 45 through passageway 82 and with the space 83 above the piston housing 24 and underneath the cover 28 which will be termed the control chamber.

Figures 5, 7:
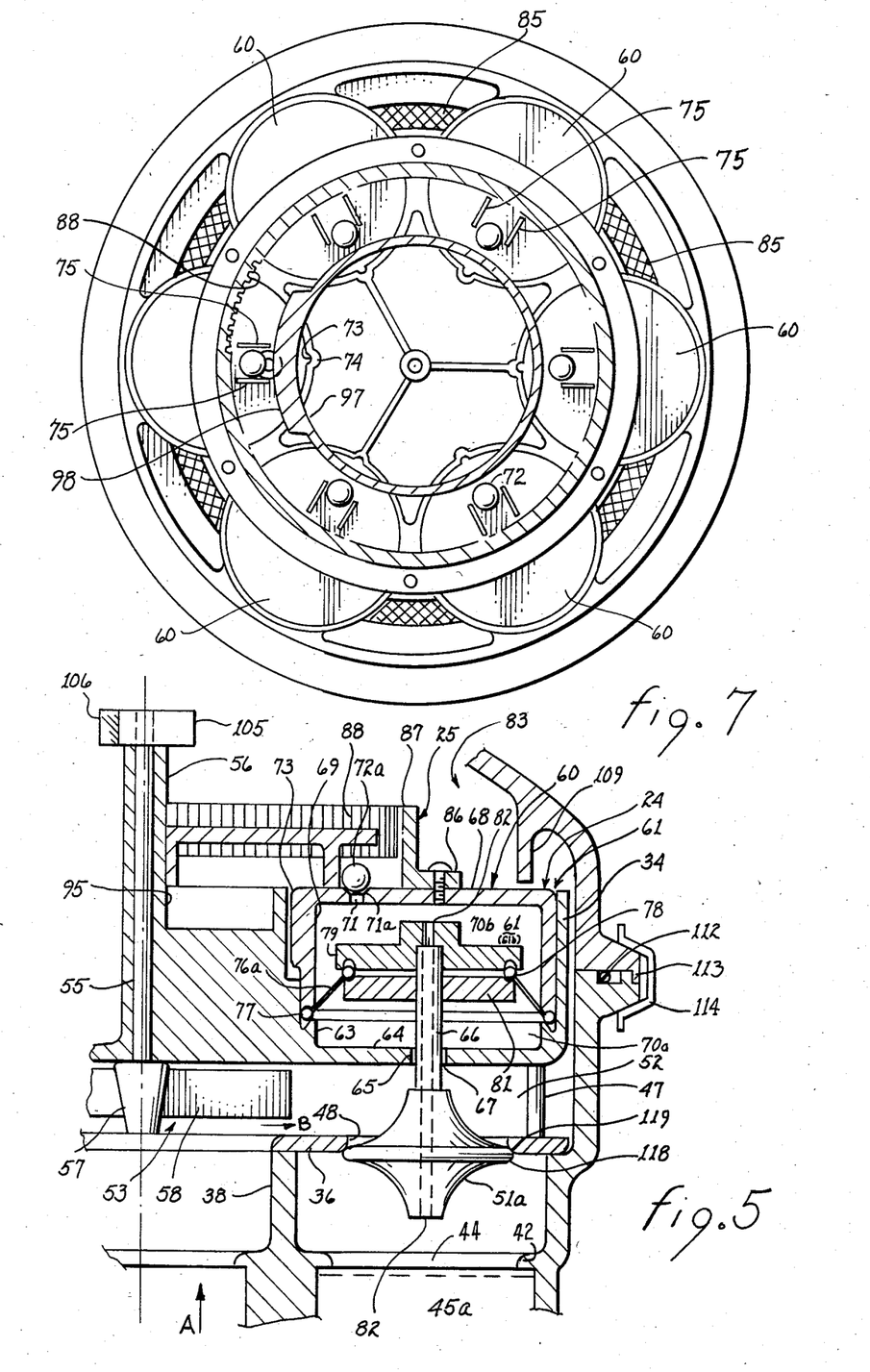
FIG. 5 is a fragmentary sectional view on enlarged scale of the device illustrated in FIG. 3 and 4.
FIG. 7 is a sectional view taken substantially in the direction of the arrow 7—7 of FIG. 3.

Between the walls of the cylindrical chambers 61 and extending through the longitudinal extent of the piston housing 24 are a series of passageways 84, FIGS. 4, 7 and 8. The lower terminii of these passageways are openings across which extend fine screens 85. Thus the lower surface of a screen 85 communicates with the flow chamber or compartment 52 and its upper surface through the passageway 84 communicates with the control chamber 83. The area of each screen opening 85 is relatively small, for example, about one-half square inch in area for each opening. This is relatively quite small compared to the overall flow area as exemplified by the total cross section of six outlet conduits 45. Accordingly a relatively small amount of water flows through the screen openings 85 into the control chamber 83. Consequently the screen 85 may be very fine and thus would screen out all grit and the like. Consequently the control water in the control chamber 83 is free of grit and complications in the operation of the valve are essentially avoided. This is contrary to the operation of the valves of the prior art where the flow as it enters the valve and exits the valve for the principal flow operation passes through the valve operating area. In this case any screens that are disposed therein must be relatively course in order to avoid cutting down the principal flow.

The ring gear 25 has an annular base 86 which is disposed on the upper surface of the piston housing 24. Extending upwardly from the annular base 86 is an annular gear ring 87, gear teeth 88 being on the interior surface thereof. When the ring gear 25 is disposed on the upper surface of the piston housing 24 the screw holes 89 in the annular base 86 line up with the screw holes 91 in the webs of the piston housing so that screws 92 may hold the ring gear in position as shown in the drawing. The interior surface of the gear teeth 88 provide a barrier for preventing the balls 72 from escaping or falling out.

Interiorly of the ring gear 25 is the valve operator 26 which has a central opening 93 through which the bearing support 56 is received in the assembled condition. For this purpose a cylindrical hub 95 extends downwardly from the upper surface 96 of the valve operator. Also extending downwardly from the upper surface is an operating ring 97 which includes a protuberance or operating cam 98. The outer radius of the ring 97 is such that the ring is spaced away from the balls 72 when the balls are disposed in the chamfered openings 71 as may be seen in FIG. 5 and engages the balls to push them away from the chambered opening 71 when the cam surface 98 comes opposite the balls 72 as may be visualized in FIGS. 3 and 7.

Disposed on the upper surface 96 is a series of gears 27 of which there may be any number, four being shown in this instance, the outer gear 101 engaging the teeth of the ring gear 88 and the inner gear 102 engaging the smaller gear 103 of the pause mechanism 31, the gear 103 being attached to the shaft 54 of the impeller 53. The fit of the gear 103 on the shaft 54 is such that the impeller is held in the assembled condition.

The pause gear 103 is attached to and forms part of a catch member 104 having two oppositely extending catch arms 105 and 106. Thus it may be visualized that as the impeller 53 rotates under the influence of water flowing radially outwardly in the flow chamber 52 the pause gear 103 including the catch member 104 rotates very rapidly but with very little operating torque and, through the gear train 27 (gears 101, 102 and the gears in between) it causes the valve operator 26 to rotate inasmuch as the gear 101 engages the gear teeth 88 of the ring gear. As the valve operator 26 rotates under this influence the cam member or protuberance 98 causes the balls 72 to be moved out of and into the chamfered openings 71 in succession. The pause member 31 may be detained or paused as will be subsequently described in this specification.

The cover or top member 28 is a hood shaped member having a flanged base 107 from which the hood 108 extends upwardly. The dimensions of the hood 28 are such that the operating parts as illustrated may be easily accommodated. Extending downwardly interiorly of the hood is a ring flange 109 which extends downwardly sufficiently to be adjacent the upper surface of the piston housing 24. A slight clearance may be provided between the bottom edge of the ring flange 109 and the upper surface of the piston housing 24 so that some slight adjustment of movement of the piston housing 24 may be possible under the influence of pressure inside thereof during operation.

The flange base 107 is of a dimension to overfit the upper flange 111 at the top of the base member 23. A ring gasket 112 shown disposed in a groove forming part of the upper flange 111 seals the opening of the base 23 to the top or cover 83. A depending flange 113 surrounds an appropriate surface of the upper flange 111 to assure proper interfitting of the members. A flexible U-shaped clamping ring 114 of well-known construction may be provided to hold the cover and the base together. Further disclosure of the clamping ring 114 including the arrangements for holding two ends thereof together is not believed necessary.

At the top of the cover 28 on the dome 108 is the pause control knob 32 which has a shaft like member 115 extending through the dome at the lower end of which is a detent 116. The detent 116 includes a hook 117 which is in a location to engage either of the extending arms 105 and 106 in one position of operation which may be termed the pause position. When the knob is turned to a different location the detent 116 moves to the position shown by the broken line in FIG. 6 and thus the hook 117 is out of the way of the arms 105 and 106 whereby rotation thereof is not detained.

With this description of the operating parts further description and understanding may be provided by a description of the operation of the valve structure. In the position shown in FIGS. 3, 4 and 5 the valve 51a is shown closed and the valve 51b is shown open, these positions being assumed for purposes of explanation and are exemplary. For this condition to apply the ball 72a associated with the outlet pipe conduit 45a is on the seat 71a and the ball 72b is shown away from the chamfered valve seat 71b associated with the outlet conduit 45b.

It will be assumed for purposes of explaining the operation of the valve that water pressure is being supplied through conduit 41 as shown by the arrow A in the various figures. Water flowing in the direction of arrow A impinges upon the vanes of the impeller causing it to rotate and the water flow spreads out as shown by the arrows B in these same figures. The pressure of the water supply therefore exists in the flow chamber 52 and is exerted through the passageway 67 in the chamber 70a below the diaphragms 76. This same water pressure is exerted through the screen openings 85 and the passageways 84 in the space 83 above the piston housing 34 and the operating components shown in the control chamber 83. The water pressure in the control chamber 83 is available through the chamfered valve seat 71a whenever a particular ball 72 is moved from the valve seat so that on appropriate occasions the water pressure in the control chamber 83 is applied to the upper surfaces of the diaphragm 76 and the member 79 to which it is connected. The flow necessary to operate the valves is a relatively small amount since the only volume of water needed is that necessary to fill the chambers 6b sufficiently to cause the particular diaphragm to move downwardly.

Referring to FIG. 5 the valve body 51a is shown having a particular shape although this is not specifically significant as any shape may be used. The valve body however must have a diameter of sufficient extent so as to provide a valve closing surface 118 of the same diameter as the valve or chamfered surface 119 forming a part of a valve opening 48 in the valve shut-off plate 36. The valve 51a is shown closed, indicating that the ball 72a is in the valve seat 71a thus sealing off the pressure existing in the control chamber 83 from the chamber 70b above the diaphragm 76a. The liquid in the chamber 70b has leaked away through the passageway 82 into the conduit 45a which may be connected to the swimming pool, for example, and is at a lower pressure than exists in the flow chamber 52. The pressure in the conduit 45a is of course exerted against the undersurface of the valve 51a while the pressure in the flow chamber 52 is exerted against the upper surface of valve body 51a. However the pressure in the flow compartment is exerted through the passageway 67 into the chamber 70a below diaphragm 76a. The cross sectional area of the diaphragm including the retaining member 81 is larger than the effective area of the valve member 51a. Accordingly, the pressure in the flow chamber 52 exerted through the passageway 67 causes the diaphragm operating structure to close the valve 51a against the pressure in the flow chamber 52. Water hammer is thus avoided.

Referring to FIG. 3, the valve member 51b is shown in the open position, this valve member having the same constructional features as the valve member 51a and need not be further described. The valve 51b being shown open the ball 72b is off of the chamfered opening 71b thus permitting the pressure in the control chamber or compartment 83 to be exerted through the opening 71b into the chamber 61b above the diaphragm 76b. The pressure in the chamber 61b urges the diaphragm valve operating mechanism downwardly and since this pressure is balanced against the total pressure in the chamber below the diaphragm, although the force above the diaphragm is greater by virtue of the valve stem 66 reducing the area available below the diaphragm, there is an increased force above the diaphragm tending to open the valve 51b. The pressure in the flow chamber 52 is of course exerted against the upper surface of the valve 51b and the pressure below the valve surface 51b is that in the conduit 45b corresponding to the flow pressure and thus there is an increased force causing the valve to open and it does, as shown.

It may be visualized that when the cam surface or protuberance 98 moves out of the way the small amount of flow taking place through the opening 71b causes the ball 72b to move back into the chamfered opening 71b sealing off this opening. Hence the fluid in chamber 61b leaks off through the passageway 82 into the conduit 45b, thus reducing the pressure in chamber 61b to that in conduit 45b. Hence the pressure underneath the diaphragm 76b which is the same as that existing in the flow chamber 52 causes the valve 51b to close against the force of the flow taking place as shown by the arrows C. When the valve operating member 26 moves around to the point where the cam surface 98 moves the ball 72a out of the chamfered opening 71b thereby permitting the pressure inside of the control chamber 83 to be exerted again against the upper surface of the diaphragm 76a and the associated structure, the valve 51a again opens.

This process continues as may be visualized by observing FIG. 7 so that the balls 72a, b, etc. are successively moved out of their positions thereby opening the chamfered valve seat below and permitting the valve member in that location to open and close as the cam surface 98 moves against the ball and then away from it. As may also be observed in this figure the balls 72 etc. are held, in part, in their location by the parallel upstanding members 75 and the surface containing the gear teeth 88 of the gear ring. Thus the balls do not move out of their assigned locations. The diameter of the upper surface 96 of the valve operating member is of sufficient size to prevent the balls from moving out of the top of their confinement.

It may be observed that so long as water is flowing in through conduit 41, and then moves outwardly from arrows A toward arrows B and then arrows C, one of the valve members will always be open and therefore flow will always take place. Thus, the impeller 53 will continue to rotate and through the gear mechanism 27 will cause the valve operating member 26 to continue to rotate. The cam member 98 is of sufficient circumferential extent that there will be a slight overlap between the opening and closing of successive valves because two successive ball members 72 will have been moved away from their valve seats 71 at the same time. Thus a succeeding valve ball is moved away from its seat while the preceeding valve ball is also still away from its seat. Two valves are open at the same time. The overlap however may be as small as desired.

In the event that any of the diaphragms should rupture so that the pressure below the diaphragm and the pressure above the diaphragm become equal, the valve members 51 will open because the pressure in the flow chamber 52 is exerted downwardly against the valve members which causes them to open. If all the diaphragms should fail the valves all will remain open thereby preventing an increase in pressure in the control chamber 83 and thus on any and all of the operating components above and within the piston housing. In some prior art devices when the diaphragms fail the valves remain closed. Consequently, the pressure against the operating components becomes the same pressure that exists statically in the supply system which can damage some of the parts.

The impeller 53 rotates at relatively high speed although there is relatively little torque being exerted by it. Hence the gear system 27 is needed to convert the high speed low torque movement of the impeller at gear 102 into a relatively low speed and high torque at the gear 101. The pause mechanism 31 as has been described includes the projecting arms 105 and 106. When it is desired to stop the operation of the valve at some particular point in its rotation, for example, at the point when the valve 51b, as shown, is open, the pause control of 32 is rotated so that the detent 116 is moved counter-clockwise until the hook 117 engages one of the projecting arm, for example 106. At this point the catch member 104 discontinues rotation. The shock of doing this is not great because the torque being exerted by the impeller on the pause mechanism, for example, the arms 105 and 106 is not great. When the arms 105 and 106 are no longer rotating, the gears are not rotating, the valve operating member 26 remains stationary and the particular valve 51b remains open and all other valves remain closed. This enables the particular cleaning heads, for example those on the steps as shown in FIG. 1 to remain down and not interfere with the actions of swimmers who may be using the steps to sit on. Similarly the heads 15 on the floor or on the transition areas of the floor may be stopped as desired, for example, when the pool is being manually cleaned. While the valve mechanism is stopped in one position and the valve 51b remains open the pressure inside of the control chamber 83 remains at its flow value and does not build up to the static value that exists in the supply line 41 or in the flow chamber 52 when flow is discontinued.

Figure 6:
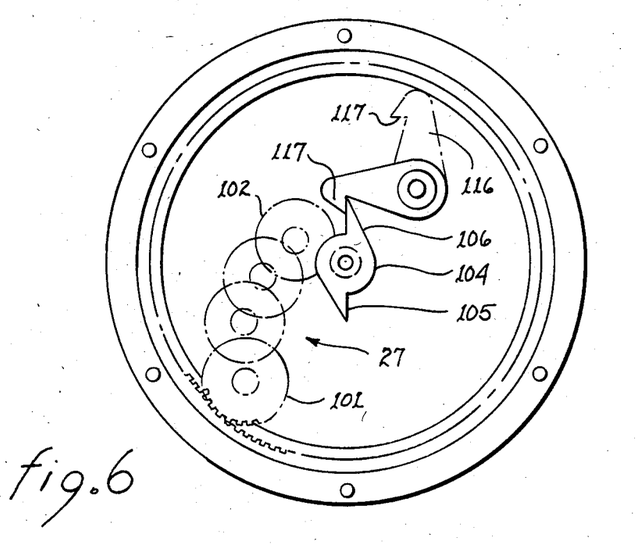
FIG. 6 is a sectional view taken substantially in the direction of the arrows 6—6 of FIG. 3.

When it is desired again to start the valve operating so that the heads are supplied with water in succession the control knob 32 is moved to the run position which is to say that the detent 116 is moved clockwise to the position shown by the dot/dash line in FIG. 6 thus removing the hook member 117 from the arm 106. This permits the flow taking place in the flow chamber 52 to cause the impeller 53 to again rotate thereby causing the valve operating member 26 to rotate and the valves to open and close in succession.

The valve parts may be made of well-known synthetic and lightweight materials as is well understood. Other materials may of course be used.

The invention has been shown in one form. It will be understood by those skilled in the art that many variations may be made in the various parts, constructions, etc. and that it is intended by the appended claims to encompass all of the forms that come within the scope of the disclosure.

I claim:

1. A fluid distribution valve comprising,
a flow compartment and a control compartment separated from each other,
inlet flow means in said flow compartment, a series of outlet flow means in said flow compartment,
valve means disposed in each of said series of outlet flow means for opening and closing same and adapted for opening due to the pressure in said flow compartment applied against one side thereof,
an impeller in said flow compartment and adapted for rotation flow therein,
valve operating means having two sides for each of said valve means disposed in said control compartment, said valve operating means being adapted for closing said valves against the pressure in said flow compartment due to the pressure in said flow compartment, applied to one side thereof, whereby said valve means opens upon failure of said valve operating means,
means for applying flow compartment pressure to said one side,
means for supplying pressure from said flow compartment to said control compartment, and
means in said control compartment controlled by rotation of said impeller for applying and removing said control compartment pressure to the other side of said valve operating means.

2. A fluid distribution valve comprising,
a base member having a fluid inlet and a series of fluid outlets therein,
a valve plate having an inlet opening and a series of valve seat openings disposed on said base with corresponding openings in alignment,
a series of valve members disposed adjacent said valve seat openings for closing and opening same,
a piston housing member having a series of chambers corresponding to said valve members disposed on said base and spaced from said valve plate to form a flow compartment,
a series of two sided pistons one each of which is disposed in each chamber of said piston housing, each of said pistons being connected to one of said valve members for operating same,
a cover member disposed on said base member over said piston housing and with said piston housing defining a control compartment,
first openings connecting said flow compartment and said control compartment,
second openings between one side of each of said two sided pistons and said flow compartment,
third openings between the other side of said two sided pistons and said control compartment,
means for controlling said third openings between an open state and a closed state, an impeller in said flow compartment adjacent said inlet opening and adapted to rotate upon flow through said inlet opening, gear mechanism in said control compartment connected to said impeller, and means operated by said gear mechanism in response to rotation of said impeller for sequentially actuating said controlling means.

3. A fluid distribution valve comprising:

a flow chamber and a control chamber separated from each other, a fluid passage from said flow chamber to said control chamber, filter means disposed in said fluid passage for filtering control flow, inlet flow means to and a series of outlet flow means from said flow chamber, a series of valve means one each being in each of said series of outlet flow means and being adapted to close against the pressure in said flow chamber, and means controlled by the pressure in said control chamber for sequentially closing the valves of said series of valves against the pressure in said flow chamber.

4. The fluid distribution valve according to claim 2 wherein the gear mechanism comprises a gear train having one gear operated by said impeller and an interior ring gear mounted on said piston housing, said gear train having another gear engaging said gear ring.

5. The fluid distribution valve according to claim 4 wherein the means operated by the gear mechanism comprises a rotating cam plate, said gear train being supported on said cam plate, a circular dwell surface on said rotating cam plate, and a cam member projecting from said dwell surface.

6. The fluid distribution valve according to claim 5 wherein the means controlling said third openings comprises ball members adapted to seat on said third openings and being movable by said projecting cam members.

7. The fluid distribution valve according to claim 2 including run and pause mechanism for controlling movement of said impeller.

8. The fluid distribution valve according to claim 7 wherein the run and pause mechanism comprises a pause gear including a detent in said control compartment and connected to said impeller for rotation therewith, a retaining member attached to said cover member and pivoted to engage and disengage said detent in the pause condition and the run condition respectively, and operating handle exterior to said cover member for moving said retaining member.

9. A fluid distribution valve comprising:

a base member having an inlet port and a series of outlet ports for attachment to plumbing connections, a removable valve module member having an inlet port, a series of outlet ports and valve operating components disposed therein, said module member being disposed in said base member with the inlet port and the outlet ports in registration with each other, respectively, a non-plumbing connection cover member attached to said base member, and said removable valve module member including piston housing members, a series of two sided pistons, a flow chamber in combination with said base member, a control chamber in combination with said cover member, fluid passages from said flow chamber to said control chamber, and filter means disposed in said fluid passages.

10. The fluid distribution valve according to claim 1 wherein a valve module member contains all of the valves' working parts.

11. The fluid distribution valve according to claim 10 wherein said valve module comprises a piston housing member, and a valve shutoff plate connected to and spaced from each other, the space between said piston housing member and said shut-off plate defining a fluid flow compartment, and the space of said valve module member and therebetween and said cover member defining a fluid flow control compartment.

12. A fluid distribution valve according to claim 1 wherein said valve operating means includes a diaphragm exposable on one side to the pressure in said flow compartment and on the other side of the pressure in said flow compartment.

* * * * *

UNITED STATES PATENT AND TRADEMARK OFFICE
CERTIFICATE OF CORRECTION

PATENT NO. : 4,592,379
DATED : June 3, 1986
INVENTOR(S) : John M. Goettl

It is certified that error appears in the above-identified patent and that said Letters Patent is hereby corrected as shown below:

Column 12, line 24, the word ---upon--- should be inserted between "rotation and "flow".

Signed and Sealed this

Twenty-third Day of September 1986

[SEAL]

Attest:

DONALD J. QUIGG

Attesting Officer     Commissioner of Patents and Trademarks